(12) United States Patent
Langille (10) Patent No.: US 10,582,241 B2
(45) Date of Patent: *Mar. 3, 2020

(54) METHOD AND APPARATUS FOR BIOMETRIC IDENTIFICATION OF A USER IN A BROADCAST COMMUNICATION RECEIVER

(71) Applicant: DISH Technologies L.L.C., Englewood, CO (US)

(72) Inventor: Gary Richard Langille, Greenwood Village, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,267

(22) Filed: Aug. 27, 2018

(65) Prior Publication Data

US 2018/0367831 A1 Dec. 20, 2018

Related U.S. Application Data

(63) Continuation of application No. 15/594,307, filed on May 12, 2017, now Pat. No. 10,063,900, which is a (Continued)

(51) Int. Cl.
*H04N 21/2547* (2011.01)
*H04H 60/45* (2008.01)
(Continued)

(52) U.S. Cl.
CPC ........ *H04N 21/2547* (2013.01); *H04H 60/45* (2013.01); *H04H 60/65* (2013.01);
(Continued)

(58) Field of Classification Search
CPC ........... H04N 21/2547; H04N 21/4508; H04N 5/4403; H04N 21/812; H04N 21/4627;
(Continued)

(56) References Cited

U.S. PATENT DOCUMENTS 5,550,575 A 8/1996 West et al.
6,100,916 A 8/2000 August et al.
(Continued)

OTHER PUBLICATIONS

"Atmel's FingerChip Biometric Sensor Selected by Rise Computer for its Robust Security", Jun. 2, 2008, excerpt from the findBiometrics.com internet site located at http://www.findbiometrics.com/press-release/5170, retrieved on Jun. 30, 2008, 3 pages.
(Continued)

*Primary Examiner* — Ryan W Sherwin
(74) *Attorney, Agent, or Firm* — Kilpatrick Townsend & Stockton LLP (57) ABSTRACT

In a method for identifying a user in a network of broadcast communication receivers, a physical characteristic of a user is analyzed in association with the user accessing a first of the receivers. First biometric information based on the characteristic as analyzed in association with the user accessing the first receiver is generated. Data associated with use of the first receiver by the user is also generated and associated with the first biometric information. The physical characteristic of the user is then analyzed in association with the user accessing a second receiver. Second biometric information based on the physical characteristic as analyzed in association with the user accessing the second receiver is generated. The first and second biometric information are then compared. If the first and second biometric information indicate the physical characteristic of the same user, the data is employed in conjunction with the user accessing the second receiver.

20 Claims, 4 Drawing Sheets

Related U.S. Application Data continuation of application No. 12/167,439, filed on Jul. 3, 2008, now Pat. No. 9,654,719.

(51) Int. Cl.

| | | |
|---|---|---|
| *H04H 60/65* | (2008.01) | |
| *H04H 60/80* | (2008.01) | |
| *H04L 12/28* | (2006.01) | |
| *H04N 7/173* | (2011.01) | |
| *H04N 21/254* | (2011.01) | |
| *H04N 21/258* | (2011.01) | |
| *H04N 21/422* | (2011.01) | |
| *H04N 21/436* | (2011.01) | |
| *H04N 21/4415* | (2011.01) | |
| *H04N 21/4627* | (2011.01) | |
| *H04N 21/81* | (2011.01) | |
| *H04N 5/44* | (2011.01) | |
| *H04N 21/45* | (2011.01) | |
| *H04H 60/46* | (2008.01) | |

(52) U.S. Cl.
CPC ......... *H04H 60/80* (2013.01); *H04L 12/2829* (2013.01); *H04N 5/4403* (2013.01); *H04N 7/17318* (2013.01); *H04N 21/2542* (2013.01); *H04N 21/25875* (2013.01); *H04N 21/25883* (2013.01); *H04N 21/42201* (2013.01); *H04N 21/43615* (2013.01); *H04N 21/4415* (2013.01); *H04N 21/4508* (2013.01); *H04N 21/4627* (2013.01); *H04N 21/812* (2013.01); *H04H 60/46* (2013.01)

(58) Field of Classification Search
CPC ......... H04N 21/4415; H04N 21/43615; H04N 21/42201; H04N 21/25883; H04N 21/25875; H04N 21/2542; H04N 7/17318; H04H 60/45; H04H 60/80; H04H 60/65; H04H 60/46; H04L 12/2829
See application file for complete search history.

(56) References Cited

U.S. PATENT DOCUMENTS

| | | |
|---|---|---|
| 6,418,424 B1 | 7/2002 | Hoffberg et al. |
| 6,438,752 B1 | 8/2002 | McClard |
| 6,526,577 B1 | 2/2003 | Knudson et al. |
| 6,945,870 B2 | 9/2005 | Gatto et al. |
| 6,970,098 B1 | 11/2005 | Adams et al. |
| 7,346,917 B2 | 3/2008 | Gatto et al. |
| 7,606,765 B1 | 10/2009 | Asack et al. |
| 7,624,417 B2 | 11/2009 | Dua |
| 7,721,313 B2 | 5/2010 | Barrett |
| 7,853,474 B2 | 12/2010 | Ullah |
| 8,209,735 B2 | 6/2012 | Gautier |
| 9,654,719 B2 | 5/2017 | Langille |
| 2002/0066103 A1 | 5/2002 | Gagnon et al. |
| 2003/0050062 A1 | 3/2003 | Chen et al. |
| 2003/0172283 A1 | 9/2003 | O'Hara |
| 2005/0122209 A1 | 6/2005 | Black |
| 2005/0273808 A1 | 12/2005 | Zeidman |
| 2006/0085345 A1 | 4/2006 | Khandelwal et al. |
| 2006/0155398 A1 | 7/2006 | Hoffberg et al. |
| 2006/0189307 A1 | 8/2006 | Ritter |
| 2007/0011704 A1 | 1/2007 | Anglin, Jr. |
| 2007/0033414 A1 | 2/2007 | Dunko |
| 2008/0064396 A1 | 3/2008 | Igoe |
| 2008/0320519 A1 | 12/2008 | Beadle et al. |
| 2009/0217356 A1 | 8/2009 | Scott et al. |

OTHER PUBLICATIONS

Harris, Tom, "How Fingerprint Scanners Work," retrieved from https://computer.howstuffworks.com/fingerprint-scanner.htm/printable, Accessed on Sep. 23, 2019, 8 pages.

METHOD AND APPARATUS FOR BIOMETRIC IDENTIFICATION OF A USER IN A BROADCAST COMMUNICATION RECEIVER

PRIORITY CLAIM

This application is a Continuation of U.S. application Ser. No. 15/594,307, filed May 12, 2017, granted as U.S. Pat. No. 10,063,900 on Aug. 28, 2018, and entitled "METHOD AND APPARATUS FOR BIOMETRIC IDENTIFICATION OF A USER IN A BROADCAST COMMUNICATION RECEIVER," which is a Continuation of U.S. application Ser. No. 12/167,439, filed Jul. 3, 2008, granted as U.S. Pat. No. 9,654,719 on May 16, 2017, and entitled "METHOD AND APPARATUS FOR BIOMETRIC IDENTIFICATION OF A USER IN A BROADCAST COMMUNICATION RECEIVER," the contents of which are incorporated herein by reference in their entirety.

BACKGROUND

Broadcast communication receivers, such as satellite and cable television set-top boxes, or "STBs", often provide features to help the user customize the set-top box in accordance with the user's viewing or listening preferences. For example, some set-top boxes allow a user to designate a number of specific programs or channels as personal favorites to simplify access by the user to the broadcast channels and programs of particular interest from among the extensive amount of programming options typically available on the set-top box. Further, in set-top boxes that provide a digital video recorder (DVR) capability, this same type of information may be employed to allow the user to quickly configure the set-top box to record the user's favorite programs.

Given that several different users, such as a number of family members living in the same household, may all use the same set-top box, some manufacturers have further enhanced their set-top boxes by allowing the creation of separate channel or programming favorites lists and recording parameters for each user. Typically, each such list may be identified with a label, such as a user's name, although most such lists are accessible by all users of the set-top box.

Many set-top boxes also provide a parental control or security function which allows a user to define an alphanumeric password to block selected channels and/or programs from those users not privy to the password. Thus, these particular boxes provide parents the capability to prevent some young family members from viewing programs that are inappropriate for their age.

In some cases, multiple set-top boxes may be employed in a single household, as some subscribers may enjoy the use of several televisions in different rooms throughout the home. In that case, each set-top box may possibly be used by several users within the house, thus possibly implicating the need for a copy of each user's favorites list, recording schedule, and the like in each separate set-top box within the household.

DETAILED DESCRIPTION

Figure 1:
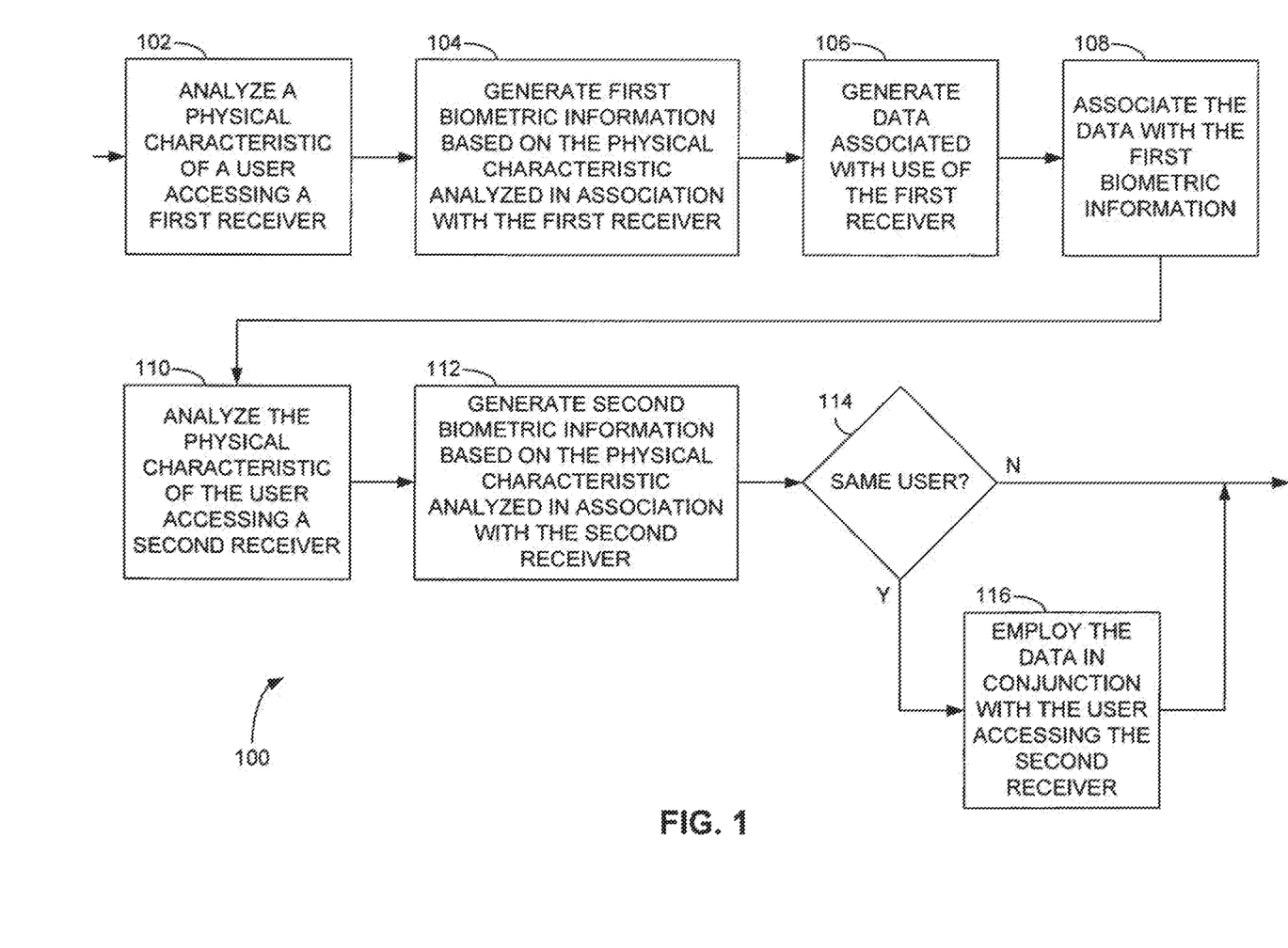
FIG. 1 is a flow diagram of a method according to an embodiment of the invention for identifying a user in a network of broadcast communication receivers.

FIG. 1 provides a flow diagram of a method 100 for identifying a user in a network of broadcast communication receivers. Each of the broadcast communication receivers may be a satellite television receiver or set-top box (such as a set-top box employed in a direct broadcast satellite (DBS) system), a cable television receiver, a satellite radio receiver, or other receiver configured to receive broadcast communications, either via wireline or wireless communication technologies. The user may be, for example, a single individual, or a number of individuals identifiable as a single group.

In the method 100, a physical characteristic of a user accessing a first one of the broadcast communication receivers is analyzed (operation 102). In one implementation, the physical characteristic may be any physical characteristic that may be exploited to distinguish one user from another. Examples of the physical characteristic include, but are not limited to, a fingerprint, an iris or retina of an eye, a facial appearance, a voice of a user, and a bodily substance of the user. Such bodily substances may include, but are not limited to, perspiration, blood, and a scent of the user.

First biometric information based on the physical characteristic analyzed in association with the user accessing the first broadcast communication receiver is then generated (operation 104). Also generated are data associated with the use of the first one of the broadcast communication receivers by the user (operation 106). This user-specific data may be associated with a number of functions or capabilities provided by the broadcast communication receiver. In one implementation, the data may be a list of a user's favorite programs or programming channels, a list of programs to record on a DVR incorporated within the receiver, or the like. In another embodiment, the data may enable a security mechanism regarding access to other data within the receiver, to programs or channels accessed via the receiver, or to the receiver itself. Alternatively, the data may be information associated with product or service purchases the user makes via the receiver. In other examples, the user-specific data may include data associated with an account the user maintains with a service provider that supplies informational content to the user by way of the broadcast communication receiver. Other examples of user-specific data not specifically described herein may be employed in other embodiments. This data is then associated with the first biometric information (operation 108).

Thereafter, in association with the user accessing a second broadcast communication receiver of the network, the same physical characteristic of the user may be analyzed (operation 110), and second biometric information based on this analysis is generated (operation 112). The second biometric information is then compared to the first biometric information (operation 114). If the first and second biometric information both indicate the physical characteristic of the same user, the user-specific data is employed in conjunction with the user accessing the second broadcast communication receiver (operation 116).

While the operational steps are described above and displayed in FIG. 1 in a specific order, other orders of execution, including concurrent execution of two or more of the operations, may be possible while remaining within the scope of the invention as disclosed herein.

Figure 2:
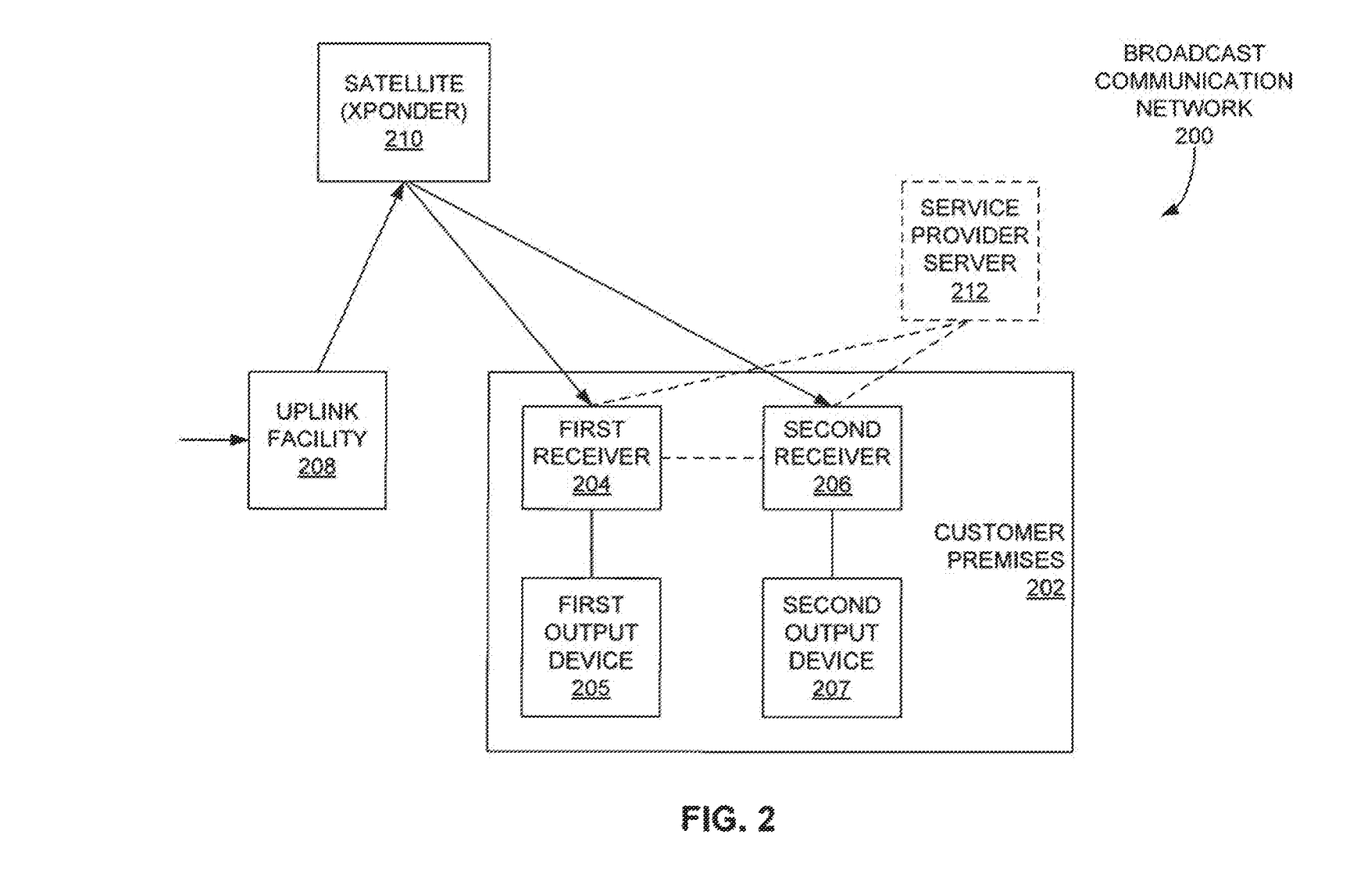
FIG. 2 is a block diagram of a broadcast communication network according to an embodiment of the invention that incorporates multiple broadcast communication receivers.

The simplified block diagram of FIG. 2 depicts a broadcast communication network 200 according to another embodiment. The broadcast communication network 200 includes a first broadcast communication receiver 204 and a second broadcast communication receiver 206. In FIG. 2, the receivers are located within a subscriber premises 202, although other ways of associating the receivers 204, 206 with each other, either geographically or logically, may be identified. For example, receivers located in separate buildings may be associated with a single subscriber account, and thus be included in the same broadcast communication network 200 discussed in greater detail below.

In the specific example of FIG. 2, the receivers 204, 206 are satellite broadcast set-top boxes. Providing programming and other informational content to the receivers 204, 206 is an uplink facility 208 configured to deliver the programming and other information to a satellite 210 containing a number of transponders for retransmitting the received information to the receivers 204, 206 of FIG. 2, as well as other receivers not shown therein. The informational content may be encoded, modulated, and processed in other ways not discussed herein for the sake of brevity.

In turn, the receivers 204, 206 receive the informational content, and perform any demodulation, decoding, and other processing required to recover the informational content. Each of the receivers 204, 206 may then provide the content to an output device 205, 207, such as a television, video monitor, entertainment system, or other device configured to provide the content to a user. In some implementations, each of the output devices 204, 206 may be integrated within its corresponding receiver 204, 206, or vice-versa.

To form a network, the first receiver 204 and the second receiver 206 may be communicatively coupled together. In one embodiment, the receivers 204, 206 may communicate over a HomePlug® interface. However, other interfaces, including both wired and wireless interfaces, such as Ethernet, Wi-Fi, and the like, which are capable of carrying information between the first receiver 204 and the second receiver 206 may be utilized in other implementations. Also, while FIG. 2 indicates that the receivers 204, 206 may be directly coupled to each other, one or more devices adapted to facilitate communication between the receivers 204, 206, such as transceivers, routers, and so forth, may be utilized in other implementations.

In addition to, or in lieu of, the receivers 204, 206 being coupled to each other, a service provider server 212 supplied by the service provider transferring the informational content to the receivers 204, 206 may be communicatively coupled with each of the receivers 204, 206. The server 212 may provide any of a number of services to the receivers 204, 206, such as receive and process requests for pay-per-view (PPV) movies and other special events, provide access to information associated with a user account held by the service provider, and other services. In one implementation, the server 212 may facilitate communication between the first receiver 204 and the second receiver 206. Depending on the particular implementation, the server 212 may be coupled with each of the receivers 204, 206 by way of a telephone connection, an Internet connection, or other communication path.

Figure 3:
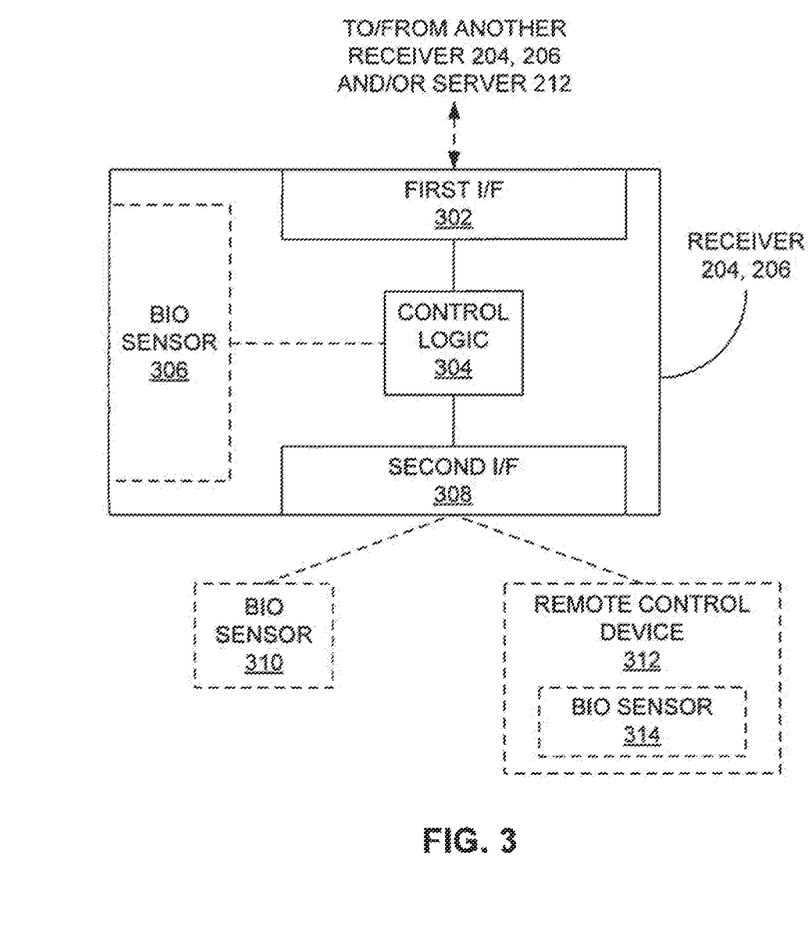
FIG. 3 is a block diagram of an example of a broadcast communication receiver of the broadcast communication network of FIG. 2 according to an embodiment of the invention.

FIG. 3 provides a simplified diagram of a possible implementation of each of the receivers 204, 206 of FIG. 2. The receivers 204, 206 includes a first interface 302 for coupling the receiver 204, 206 with at least one of another receiver 204, 206 and/or a service provider server 212, as shown in FIG. 2. Also included is control logic 306 coupled with the first interface 302 and configured to perform the various tasks described in greater detail below. Other components, such as circuitry for receiving the programming signals from the satellite 210, for performing any demodulation, decoding, and other processing of the signals, and for transmitting the signals to the output device 205, 207, are not shown in FIG. 3 to simplify and facilitate discussion of identifying users within the receiver 204, 206.

In one example, the control logic of the receiver 204, 206 may be a processor, such as a microprocessor, microcontroller, digital signal processor (DSP), or the like, with data storage including software instructions executable by the processor for performing the various tasks describe hereinafter. Such a processor may be combined with electronic circuitry to aid in the performance of these tasks. In another example, a hardware logic circuit, such as an application-specific integrated circuit (ASIC), may perform the operations discussed herein without the aid of a processor.

Figure 4:
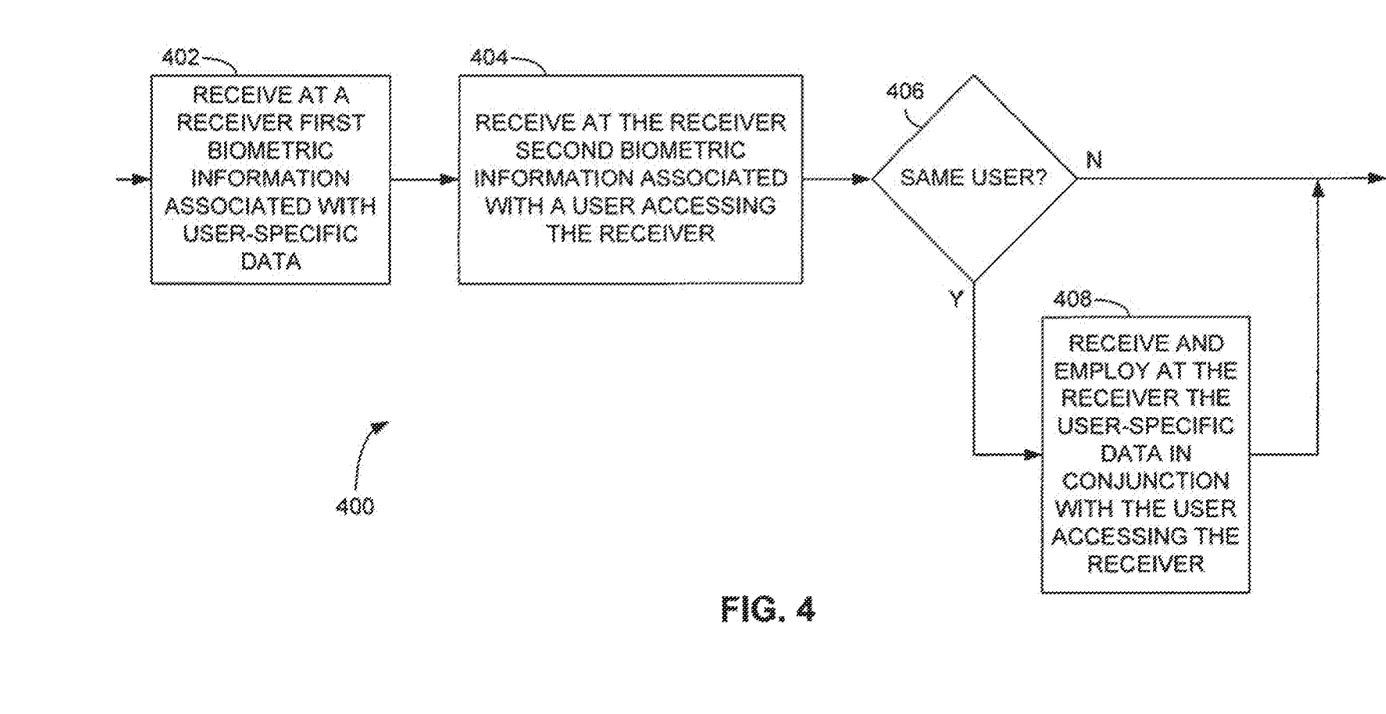
FIG. 4 is a flow diagram of a method according to an embodiment of the invention for identifying a user in a network of broadcast communication receivers, as executed by the control logic depicted in FIG. 3.

Generally, the control logic 304 of the receiver 204, 206 performs the operations of a method 400 as shown in the flow diagram of FIG. 4. While either receiver 204, 206 of FIGS. 2 and 3 may perform the following operations, the method 400 is discussed in relation to the second receiver 206. More specifically, the control logic 304 of the second receiver 206 receives via its first interface 302 first biometric information associated with data specifically related to a particular user (operation 402). In one embodiment, the first interface 302 receives the first biometric information from the first broadcast communication receiver 204, and forwards the information to the control logic 304. This information may be received over a HomePlug® connection, Wifi, Ethernet, USB, or other communication interface coupling the two receivers 204, 206 together. In one implementation, the first receiver 204 is configured to generate and/or store the first biometric information, which may be produced by way of an initial analysis of a physical characteristic or attribute of a user accessing the first receiver 204 prior to accessing the second receiver 206. Thus, generation of the first biometric information may be initiated with a first use of the first receiver 204 or any receiver of the network 200 by the user. Either or both of the first receiver 204 and the second receiver 206 may then compare the first biometric information against subsequent biometric information generated by way of analysis of the same physical characteristic. The generation of the biometric information is discussed in greater detail below.

In another example, the first interface 302 may receive the first biometric information from the service provider server 212 of FIG. 2, such as by way of a telephone or Internet connection. Further, the first biometric information may have been originally generated by the server 212, by the first receiver 204 (as described above), or by the second receiver 206 now receiving the first biometric information.

The control logic 304 of the second receiver 206 also receives second biometric information associated with a user accessing the second receiver 206 (operation 404 of FIG. 4). In one example, the second receiver 206 includes a biometric sensor 306 configured to analyze the physical characteristic or attribute of the user accessing the second receiver 206. For example, prior to using the second receiver 206 to view a program or other informational content, the user may allow the biometric sensor 306 to capture the physical characteristic, such as a fingerprint. In that case, the biometric sensor 306 may be a fingerprint scanner. As a result, the first and second biometric information may be a substantial image of the "ridges" and "valleys" of the fingerprint. In another fingerprint implementation, the fingerprint may be analyzed to discover its distinctive features, such as locations at which ridges end, or at which multiple ridges merge, a representation of which may then be stored as the biometric information. Depending on the particular physical characteristic to be analyzed, the biometric sensor may be an iris scanner, a retinal scanner, an optical imager, an audio analyzer for characterizing the voice of a user, or any other device capable of analyzing a distinguishing physical characteristic of the user.

Instead of locating a biometric sensor 306 within the second receiver 206, a separate biometric sensor 310 may be coupled with a second interface 308 of the second receiver 206. In this scenario, the second interface 308 may be a USB interface or some other wired or wireless interface, thus allowing a separate off-the-shelf biometric sensor 306 to be purchased or supplied separately from the second receiver 206, thus allowing a user to communicatively couple the sensor 306 with the second interface 308. The control logic 304 of the second receiver 206 may then receive information regarding the analysis from the sensor 306, and may use that information to generate the second biometric information. In another embodiment, the sensor 306 generates the second biometric information based on its analysis of the physical characteristic of the user, and then transfers the second biometric information to the control logic 304.

In yet another example, the second interface 308 may serve as a remote control interface communicatively coupled with a remote control device 312 incorporating a biometric sensor 314. In one implementation, the biometric sensor 314 is located so that the user may grasp the remote control 312 and immediately cause the sensor 314 to analyze a physical characteristic of the user, such as a fingerprint or iris, and then transfer either information representing its analysis of the physical characteristic, or generate and transfer the second biometric information based on that analysis, to the control logic 304 by way of the second interface 308. For example, the biometric sensor 314 may be incorporated on the bottom surface of the remote control device 312 in a position in which a user may easily contact the sensor 314 with a finger. Also, the surface of the remote control 312 may be shaped so that the user may easily register a finger in contact with the sensor 314 without looking directly at the bottom of the remote control 312. In another implementation, the sensor 314 may be placed along the top surface of the remote control 312 to facilitate a scan of the thumb of the user.

While each of these configurations regarding the biometric sensors 306, 310, 314 has been discussed within the context of the second receiver 206, similar configurations involving the first receiver 204 are possible. As a result, the first receiver 204 may employ any of the biometric sensors 306, 310, 314 to generate the first biometric information later received at the second receiver 206 (operation 402 of FIG. 4) from either the first receiver 204 or the server 212, as mentioned above. For example, a user may indicate to the first receiver 204 that they are a new user to the receiver 204. In response, the first receiver 204 may cause one of the biometric sensors 306, 310, 314 to analyze a user physical characteristic, such as a fingerprint, to generate the first biometric information, either within the sensor 306, 310, 314 or the control logic 304 of the first receiver 204.

Regardless of the source of the first biometric information, the first biometric information would then be used as a reference against which the control logic 304 compares the second biometric information as a result of the user accessing the second receiver 206 (operation 406 of FIG. 4). The nature and complexity of the comparison may be determined by the amount of analysis data representing the physical characteristic. As any two separate analyses of the physical characteristic may not match exactly, the first and second biometric information also may not be identical. As a result, the comparison of the first and second biometric information may be compared to a similarity or confidence threshold indicating a level at which the second biometric information is considered to represent the physical characteristic of the same user as that denoted by the first biometric information.

If the result of the comparison of the first and second biometric information surpasses the confidence threshold, then the control logic 304 of the second receiver 206 presumes that the users associated with both the first and second biometric information are one and the same, and receives and employs the user-specific data associated with the first biometric information in conjunction with the user accessing the second receiver 206 (operation 408). (The nature of the user-specific data, and how it is employed, is discussed further below.) Otherwise, if the result of the comparison falls below the confidence threshold, the control logic 304 presumes the user associated with the second biometric information is different from the user related to the first biometric information, and thus does not employ the user-specific information in connection with the new user accessing the second receiver 206.

In the case that several versions of first biometric information, one for each separate user of a receiver 204, 206 of the broadcast communication network 200, have been generated and stored within the network 200, then the second biometric information associated with a user accessing the second receiver 206 may be compared against all of these versions of the first biometric information. In such an environment, if the second biometric information matches one of the versions of the first biometric information, the user-specific data associated with the matching first biometric information is employed in conjunction with the current user accessing the second receiver 206. Otherwise, if the second biometric information does not match any of the sets of first biometric information, none of the user-specific data associated therewith is employed as a result of the current user's access of the second receiver 206.

In another embodiment, a group of users, each of which is associated with its own set of first biometric information, may be associated with a single set of user-specific data. In other words, access to the network 200 by any of the users within the group invokes the use of the same user-specific data. To this end, second biometric information associated with a recent user accessing the second receiver 206 is compared to each of the sets of first biometric information associated with the group, and if a match results, the single set of data is employed in conjunction with the current user using the second receiver 206. Otherwise, the single set of user-specific data is not involved with the recent user accessing the second receiver 206.

Given the above procedures, identification of a user, along with data in the network 200 specifically related to the user, is facilitated by way of a simple action of the user of allowing the network 200 to verify the identity of the user by way of a physical characteristic. Thus, the use of passwords or labels input by a user for identification purposes may be eliminated, thus easing the burden on the user to utilize data specifically associated with his or her use of the network 200 and the receivers 204, 206 located therein.

The user-specific data described above may represent many different types of information, thus causing that data to be employed in the communication network 200 in a variety of ways. A few examples of the types of data and related functionality possible are described below. However, the scope of the invention is not limited to these specific examples, but instead encompasses any type of data that may be related to a specific user and the user's interaction with the network 200.

In one example, the user-specific data may provide a mechanism whereby only authorized users may access one of the receivers 204, 206, or any other portion of the network 200. More specifically, the mere presence of user-specific data may indicate that the user associated with the second biometric information, by way of its match with the first biometric information previously generated as a result of an initial use of the first receiver 204 by the user, is authorized to view informational content and perform other functions using the second receiver 206. In another embodiment, the user-specific data may include data specifically indicating that a user whose second biometric information matches the first biometric information is authorized to use the second receiver 200.

Further regarding security, the user-specific data for a user may further grant a specified level of access, or specifically indicate which functions or services of the second receiver 206 the associated user may or may not access. Such functions may include the ability to purchase products and/or services by way of the second receiver 206 and the server 212. The products and services may be provided by the service provider (in the case of pay-per-view movies and special event programs) or a third party operating through the service provider (such as products purchased from a home shopping network). In the event that the user is authorized to purchase products or services through the second receiver 206, the user-specific data may also track which specific purchases have been made, along with any information associated with those purchases. Such information may include billing information, such as credit card information, billing and shipping addresses, and the like, to facilitate the purchases.

In one variation, the access to the second receiver 206 by a user may be controlled by a second user associated with a separate set of user-specific data. As a result, the data associated with the second user may indicate the users whose access to the second receiver 206 the second user may control. The user-specific data for the second user may include the various channels or programs, or an authorized level of access, which the second user has granted to each of the other users in the system 200.

In another embodiment, the user-specific data is utilized within the network 200 to control access to informational content provided by a content provider over the network 200 to the receivers 204, 206. This control may be asserted in various ways. For example, the user-specific data may enable the associated user to access one or more specific programs or other portions of the informational content. In one instance, the user-specific data embodies a decryption key capable of decrypting or descrambling content. Thus, by way of a positive match between the first biometric information and the second biometric information, the decryption key within the data related to the user associated with the first and second biometric information may be made available for decrypting programs which the user is authorized to view. Oppositely, users which do not have such a key included in, or associated with, its user-specific data, are not authorized to view the protected program. The authorization to view the content, as well as any decryption key required, may be granted or supplied by an owner or licensee of the program by way of an agreement between the user and the authorizer. In one example, at least a portion of the first biometric information or the second biometric information may be included within the decryption key. In another implementation, at least some portion of the first or second biometric information may be utilized to generate the decryption key.

In another application, the user-specific data denotes specific programming or other content viewed or consumed by the user associated with the data. Such data may be employed, for example, in a television ratings system, such as that provided by Nielsen Media Research. The second receiver 206 may collect and transfer this data periodically over the first interface 312 to the service provider server 212 or another server not shown in FIGS. 2 and 3. The data may identify specific programs viewed, the channel viewed, the starting and ending times for which the program or channel was viewed, and related information. Such data may further extend to those channels or programs that were recorded by way of a DVR function of the second receiver 206. As this data is associated with a specific user or group of users, as is the case with other versions of the user-specific data discussed above, the data may facilitate the tracking of viewing habits to individual users and their corresponding demographic groups.

In addition, the user-specific information may explicitly include demographic information associated with the user, such as age, sex, ethnicity, indications regarding relative interest in different genres of programming content, and the like. Many other types of demographic information may also reside within the user-specific information.

As the user-specific data may link the user with a particular demographic group, or may associate viewing habits or other characteristics with the user, the satellite 210, the service provider server 212, or another device associated with the service provider not shown in FIGS. 2 and 3, may employ the user-specific information to present to the user programming content, channels, advertising, or other content selected by the service provider. The selected content, presented to the user by way of the first receiver 204 or the second receiver 206, may be based on the user's demographic group, viewing habits, or other user-specific data.

In yet another example, the user-specific data may include a list of favorite programs or channels, or one or more program recording schedules, as determined by the user. More specifically, while a user is interacting with one of the receivers 204, 206, the user may generate or alter a favorites list or revise a recording schedule associated with the user's biometric information, as previously generated within the network 200. When the user later returns to access one of the receivers 204, 206, the favorites list and/or recording schedule of the user is again accessible to the user once the corresponding receiver 204, 206 has verified the identity of the user, as described above. In addition, the receiver 204, 206 may prohibit access to the lists or recording schedules of the user by other users of the network 200.

In each case, the user-specific data may be included in a storage device in one more of the receivers 204, 206, the server 212, or some other component of the network 200 not explicitly denoted above. Also, multiple copies of each set of user-specific data may be cached within the network 200, with one of the components being designated as possessing a "master" or up-to-date copy from which all other copies with the network 200 are derived. The same may also be true of the first biometric information, against which the second biometric information is compared.

In the embodiments described above, the comparison between the first and second biometric information is performed within the second receiver 206, which the user is currently accessing. In other embodiments, another component of the communication network 200 may perform this comparison and transmit the results thereof to the second receiver 206. For example, either the first receiver 204 or the service provider server 212 may perform the comparison. Presuming the server 212 performs the comparison, the second receiver 206 may transmit the second biometric information to the server 212, which then compares the second biometric information against the first biometric information already stored therein. The server 212 then issues a response to the second receiver 206 indicating whether the comparison was successful. Such an embodiment may be advantageous when access to sensitive information, such as information associated with a user account with the service provider, requires a relatively higher level of authentication compared to favorites lists, recording schedules, and the like.

When the comparison is performed at the server 212, the network 200 may be able to allow the user to employ user-specific data when accessing a receiver coupled with the server 212 or the network 200 generally. For example, presuming the presence of a remote broadcast communication receiver in a hotel room in which the user is staying, the remote receiver may analyze a physical characteristic of the user, generate second biometric information based on the analysis, and transmit the information to the server 212. Also, the server 212 may have already received the first biometric information in conjunction with the user accessing the first receiver 204 at home, or the server 212 may retrieve the first biometric information in response to receiving the second biometric information from the remote receiver. The server 212 may then compare the first and second biometric information. After confirming a match, the server 212 may indicate this fact to the remote receiver, which would then allow the user to use the remote receiver under the user's account as though the user were using his receiver at home. In addition, the user may have access to other user-specific information, such as favorites lists, recording schedules, recorded programs, and the like.

Various embodiments as described above may provide a number of benefits. For example, access to information specific to a user may be quickly associated with the user by way of a biometric sensor. The use of biometric information may also provide a measure of security by preventing users from accessing, modifying, or deleting information associated with another user. Additionally, when such information may be used on several components, such as set-top boxes communicatively coupled in a communication network, the use of biometric information allows the fast retrieval and employment of user-specific information on any of the networked components. Further, coupling the set-top boxes together may eliminate separate entry into each receiver of user-specific data associated with viewing preferences, parental control, and so forth by allowing a single version of the data to be disseminated to all set-top boxes of the network.

While several embodiments of the invention have been discussed herein, other embodiments encompassed by the scope of the invention are possible. For example, while various embodiments have been described primarily within the context of satellite television set-top boxes, other broadcast communication devices, including cable and terrestrial television set-top boxes, satellite radio receivers, personal digital assistants (PDAs), and mobile communication devices, may be utilized in other embodiments. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

The invention claimed is:

1. A method for identifying a user in a network of at least a first communication receiver and a second communication receiver, the method comprising:
    acquiring biometric information from the user by the first communication receiver when the user accesses the first communication receiver;
    analyzing the biometric information to identify a physical characteristic of the user in association with the user accessing the first communication receiver;
    generating first biometric information based on the physical characteristic identified;
    generating data, wherein the data is associated with account information maintained with a service provider that authorizes the user to receive content from the service provider;
    associating the data with the first biometric information;
    communicating the first biometric information in conjunction with the data to the second communication receiver;
    analyzing, at the second communication receiver, the physical characteristic of the user in association with the user accessing the second communication receiver;
    generating, at the second communication receiver, second biometric information based on the physical characteristic as analyzed in association with the user accessing the second communication receiver;
    comparing, at the second communication receiver, the second biometric information with the first biometric information; and
    if the first and second biometric information indicate the physical characteristic of the same user, the method further comprising:
    receiving the content from the service provider at the second communication receiver based on the data associated with the account information maintained with the service provider.

2. The method of claim 1, wherein the data is further associated with authorization information that authorizes the user to purchase at least one of a product or content provided by a third party operating through the service provider, the method further comprising:
    receiving the content via a communication network of the service provider at the second communication receiver based on the data associated with the account information maintained with the service provider,
    wherein the received content is purchased by the user from the third party.

3. The method of claim 1, wherein the data is further associated with authorization information that authorizes the user to purchase at least one of a product or content provided by a third party operating through the service provider, the method further comprising:

communicating a request from the second communication receiver to the third party based on the data associated with the account information maintained with the service provider,     wherein the received content is purchased by the user from the third party.

4. The method of claim 1, wherein the data is further associated with authorization information that authorizes the user to purchase the content provided by the service provider or a third party operating through the service provider, and wherein the second communication receiver is a mobile communication device that is operable to receive the content from the service provider or the third party.

5. The method of claim 1, wherein the physical characteristic comprises at least one of a fingerprint of the user, an iris of the user, a retina of the user, a face of the user, a bodily substance of the user, and a voice of the user.

6. The method of claim 1, wherein the user is a first user, and wherein the data comprises data for controlling access by the first user to informational content provided over the network as determined by a second user.

7. The method of claim 1, wherein the data comprises data associated with a user account with a communication service provider providing informational content to the network.

8. The method of claim 1, wherein the data comprises data for identifying informational content purchased by the user at the first communication receiver, wherein the informational content is provided to the first communication receiver over the network, and wherein the informational content is accessible to the second communication receiver.

9. The method of claim 1, further comprising presenting, at the second communication receiver, at least one of programs, channels, and advertising to the user based upon the data, wherein the data includes information pertaining to the at least one of programs, channels, and products purchased at the first communication receiver.

10. The method of claim 1, wherein the data is further associated with authorization information that authorizes the user to purchase at least one of a product or content provided by a third party operating through the service provider, and wherein the data comprises at least one of billing information and credit card information associated with the user to purchase the content or the product made through the second communication receiver by the user.

11. A method for identifying a user of a first communication receiver and a second communication receiver, the method comprising:

receiving, at the second communication receiver, first biometric information and data,         wherein the first biometric information uniquely identifies the user based on at least one physical characteristic of the user,         wherein the data includes account information maintained with a service provider that authorizes the user to receive content from the service provider, and         wherein the data includes authorization information that authorizes the user to purchase a product provided by a third party operating through the service provider;

analyzing, at the second communication receiver, the physical characteristic of the user when the user is using the second communication receiver; and     receiving content from the service provider at the second communication receiver based on the data associated with the account information maintained with the service provider.

12. The method of claim 11, wherein the physical characteristic comprises at least one of a fingerprint of the user, an iris of the user, a retina of the user, a face of the user, a bodily substance of the user, and a voice of the user.

13. A first communication receiver, comprising:

an interface configured to receive first biometric information and user-specific data,         wherein the first biometric information uniquely identifies a user based on at least one physical characteristic of the user, and         wherein the user-specific data includes account information maintained with a service provider that authorizes the user to receive content from the service provider;

a biometric sensor configured to capture second biometric information corresponding to the at least one physical characteristic that uniquely identifies the user; and     control logic configured to:

receive via the interface the first biometric information and the user-specific data;

receive the second biometric information while the user is using a second communication receiver;

compare the first biometric information with the second biometric information; and         receive content from the service provider at the second communication receiver based on the user-specific data associated with the account information maintained with the service provider.

14. The first communication receiver of claim 13, wherein the at least one physical characteristic comprises at least one of a fingerprint of the user, an iris of the user, a retina of the user, a face of the user, a bodily substance of the user, and a voice of the user.

15. The first communication receiver of claim 13, wherein the interface is a first interface, and further comprising:

a second interface configured to receive information indicative of the physical characteristic of the user from a remote control biometric sensor incorporated in a remote control, and transfer the information indicative of the physical characteristic to the control logic,     wherein the control logic is configured to generate the second biometric information based on the information received from the remote control.

16. The first communication receiver of claim 13, wherein the first communication receiver comprises at least one of a satellite television communication receiver, a satellite radio communication receiver, a cable television communication receiver, and a terrestrial television communication receiver.

17. The first communication receiver of claim 13, wherein the user-specific data includes authorization information that authorizes the user to purchase a product provided by a third party operating through the service provider.

18. A second communication receiver that receives content, wherein the content is authorized to be received by a user of a first communication receiver, the second communication receiver comprising:

an interface configured to receive first biometric information acquired by the first communication receiver and user-specific data provided by the first communication receiver,         wherein the first biometric information uniquely identifies the user based on at least one physical characteristic of the user, and wherein the user-specific data includes account information maintained with a service provider that authorizes the user to receive content from the service provider;
a biometric sensor configured to capture second biometric information corresponding to the at least one physical characteristic that uniquely identifies the user; and
control logic configured to:
receive via the interface the first biometric information and the user-specific data;
receive the second biometric information while the user is using the second communication receiver;
compare the first biometric information with the second biometric information; and
if the first and second biometric information indicate the physical characteristic of the same user, receive content from the service provider at the second communication receiver based on the user-specific data associated with the account information maintained with the service provider only if the user is authorized to receive the content at the first communication receiver.

19. The second communication receiver of claim 18, wherein the second communication receiver is a mobile communication device that is operable to receive content from the service provider or a third party.

20. The second communication receiver of claim 18, wherein the user-specific data includes authorization information that authorizes the user to purchase a product provided by a third party operating through the service provider.

* * * * *